US006959305B2

(12) United States Patent
Bird et al.

(10) Patent No.: US 6,959,305 B2
(45) Date of Patent: Oct. 25, 2005

(54) UNIQUE IDENTIFICATION OF SQL CURSOR OCCURRENCES IN A REPETITIVE, NESTED ENVIRONMENT

(75) Inventors: Paul M. Bird, Markham (CA); Timothy J. Vincent, Toronto (CA); Curt L. Cotner, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 464 days.

(21) Appl. No.: 10/317,234

(22) Filed: Dec. 10, 2002

(65) Prior Publication Data

US 2003/0120636 A1 Jun. 26, 2003

(30) Foreign Application Priority Data

Dec. 21, 2001 (CA) .............................. 2366196

(51) Int. Cl.[7] .............................................. G06F 17/30
(52) U.S. Cl. ........................... 707/104.1; 707/3; 707/2; 707/101
(58) Field of Search .......................... 707/104.1, 101, 707/10, 2, 3

(56) References Cited

U.S. PATENT DOCUMENTS

| 5,448,688 A | | 9/1995 | Hemingway ................ 395/141 |
| 5,463,728 A | | 10/1995 | Blahut et al. ............... 395/158 |
| 5,473,343 A | | 12/1995 | Kimmich et al. ........... 345/145 |
| 5,546,576 A | * | 8/1996 | Cochrane et al. .............. 707/2 |
| 5,742,806 A | * | 4/1998 | Reiner et al. ................... 707/3 |
| 5,809,495 A | | 9/1998 | Loaiza ........................... 707/2 |
| 5,815,138 A | | 9/1998 | Tsubaki et al. ............. 345/145 |
| 5,835,088 A | | 11/1998 | Jaaskelainen, Jr. .......... 345/343 |
| 5,838,300 A | | 11/1998 | Takagi et al. ................ 345/145 |
| 5,858,300 A | | 1/1999 | Shimizu et al. ............. 264/521 |
| 5,873,075 A | * | 2/1999 | Cochrane et al. .............. 707/2 |
| 5,956,030 A | | 9/1999 | Conrad et al. .............. 345/339 |
| 6,009,271 A | * | 12/1999 | Whatley ...................... 717/127 |
| 6,025,828 A | | 2/2000 | Berry et al. ................. 345/146 |
| 6,057,827 A | | 5/2000 | Matthews ................... 345/145 |
| 6,289,334 B1 | * | 9/2001 | Reiner et al. ................... 707/3 |
| 6,684,207 B1 | * | 1/2004 | Greenfield et al. ............ 707/3 |
| 2004/0133552 A1 | * | 7/2004 | Greenfield et al. ............ 707/1 |
| 2005/0055336 A1 | * | 3/2005 | Hui et al. ....................... 707/3 |

FOREIGN PATENT DOCUMENTS

JP 10124358 A2 5/1998 ........... G06F/12/00

* cited by examiner

*Primary Examiner*—Jean M. Corrielus
(74) *Attorney, Agent, or Firm*—John L. Rogitz

(57) ABSTRACT

A cursor query identifier is defined to uniquely identify cursors in a relational database system that supports nested routine invocation. The identifier includes a cursor nesting level value that corresponds to the nested level at which the cursor is opened. The identifier also includes a invocation identifier that corresponds to the routine within which a cursor is opened. The third part of the identifier is a unique cursor counter. The definition of the cursor query identifier permits cursors to be opened within nested levels of the same relational database context and to be uniquely identified for reference by database system and by applications accessing the system.

19 Claims, 1 Drawing Sheet

UNIQUE IDENTIFICATION OF SQL CURSOR OCCURRENCES IN A REPETITIVE, NESTED ENVIRONMENT

FIELD OF THE INVENTION

This invention generally relates to computing systems and in particular to relational database management systems that support cursors in repetitive, nested environments.

BACKGROUND OF THE INVENTION

In relational database management systems (RDBMSs) implementing a query language such as SQL (Structured Query Language), it is known to support application defined cursors. A cursor is identified relative to a query result set in a relational database and is used to access the result set in a controlled row by row manner.

A database system may support user-defined routines such as stored procedures or user defined functions (STPs or UDFs). In a stored procedure, it is possible to include statements to open a cursor, fetch data and then have the procedure execution return to the application, leaving the cursor open. The application may be defined to fetch data using the cursor opened by the stored procedure. If the application again invokes the same stored procedure, then a second occurrence of the same cursor can potentially take place. However, when the stored procedure in this example attempts to open the cursor in the second invocation, the RDBMS may return an error: the system will interpret the second open request as an attempt to open an already open cursor.

This type of problem may potentially also occur where procedures or functions are able to invoke other procedures or functions or where a single function is potentially accessible by many different processing branches of an application at the same time. Where routines are executed in parallel by the same application, the attempt to open multiple cursors with the same name in those routines may cause errors in a database system.

Unless cursor identification is uniformly maintained both at the user or client layer and at the server layer, the above problems may occur at either the client side or the server side of a relational database system. The location where an error is declared will depend on where the database system resolves identification issues for cursor requests. Although database systems will typically treat the multiple opening of cursors with the same name as an error condition, as can be seen from the above, there are many cases where it is desirable to permit cursors with the same name to be opened.

SUMMARY OF THE INVENTION

According to an aspect of the present invention there is provided an improved relational database management system that supports identification of SQL cursors in a repetitive, nested invocation environment.

According to another aspect of the present invention there is provided an SQL database management system, the system supporting nested invocation of user-defined routines and the definition of cursors, and the system carrying out execution steps in response to requests received from applications and from user-defined routines, the system comprising means for associating a unique identifier with each cursor occurrence request received by the system from a requesting process executing an application or a cursor-opening user-defined routine, the unique identifier comprising a first value corresponding to the nesting level of the cursor-opening user-defined routine or application from which the request originated, and a second value uniquely identifying the cursor-opening user-defined routine or application, relative to other user-defined routines invoked at the nesting level of the cursor-opening user-defined routine, and means for passing the unique identifier to the requesting process in response to the cursor occurrence request.

According to another aspect of the present invention there is provided the above system in which the unique identifier associated with each cursor occurrence further comprises a third value uniquely identifying the cursor occurrence relative to other cursor occurrences with the same cursor name taking place in the execution of the cursor-opening user-defined routine or application.

According to another aspect of the present invention there is provided an SQL database management system, the system supporting nested invocation of a set of user-defined routines by an application, and supporting the definition of cursors, the system including means for associating a unique identifier with each cursor occurrence in the execution of a cursor-opening user-defined routine invoked directly or indirectly by an executing application, the unique identifier including a first value corresponding to the nesting level of the cursor-opening user-defined routine and a second value uniquely corresponding to the cursor-opening user-defined routine, relative to the invocation of other user-defined routines at the nesting level of the cursor-opening user-defined routine, and means for passing the unique identifier associated with each cursor occurrence to the executing cursor-opening user-defined routine.

According to another aspect of the present invention there is provided the above system in which the unique identifier associated with each cursor occurrence further includes a third value corresponding to the sequence in which the cursor occurrence is found relative to other cursor occurrences in the execution of the cursor-opening user-defined routine.

According to another aspect of the present invention there is provided the above system in which the means for associating a unique identifier with each cursor occurrence in the execution of a cursor-opening user-defined routine invoked directly or indirectly by an executing application further includes means for defining and maintaining a set of nesting control block data structures, each nesting control block being associated with a unique nesting level of invoked user-defined routines, and including a nesting level identifier having a value corresponding to the associated nesting level and further including an invocation counter having a value corresponding to the sequence in which user-defined routines are executed at the associated nesting level.

According to another aspect of the present invention there is provided the above system in which the means for associating a unique identifier with each cursor occurrence in the execution of a cursor-opening user-defined routine invoked directly or indirectly by an executing application further includes means for defining and maintaining a set of invocation control block data structures, each invocation control block being associated with a unique invoked user-defined routine, each invocation control block including an invocation control block nesting identifier having a value derived from the nesting level identifier in the nesting control block associated with the nesting level of the unique invoked user-defined routine, an invocation identifier having a value derived from the invocation counter in the nesting control block associated with the nesting level of the unique invoked user-defined routine, and a cursor counter having a value corresponding to the sequence in which cursors are opened in the execution of the unique invoked user-defined routine.

According to another aspect of the present invention there is provided an SQL database management system, the system supporting nested invocation of a set of user-defined routines by an application, and supporting the definition of cursors in applications, the system including means for defining and maintaining a set of nesting control block data structures, each nesting control block being associated with a unique nesting level of invoked user-defined routines, and including a nesting level identifier having a value corresponding to the associated nesting level and containing an invocation counter having a value corresponding to the sequence in which user-defined routines are executed at the associated nesting level, means for defining and maintaining a set of invocation control block data structures, each invocation control block being associated with a unique invoked user-defined routine, each invocation control block including an invocation control block nesting identifier having a value derived from the nesting level identifier in the nesting control block for the nesting level of the unique invoked user-defined routine, an invocation identifier having a value derived from the invocation counter in the nesting control block for the nesting level of the unique invoked user-defined routine, and a cursor counter having a value corresponding to the sequence in which cursors are opened in the unique invoked user-defined routine, means for associating a unique identifier with each cursor occurrence in the execution of a cursor-opening user-defined routine invoked directly or indirectly by an executing application, the unique identifier including a first value derived from the invocation control block nesting identifier for the invocation control block associated with the cursor-opening user-defined routine, a second value derived from the invocation identifier for the invocation control block associated with the cursor-opening user-defined routine, and a third value derived from the cursor counter for the invocation control block associated with the cursor-opening user-defined routine, and means for passing the unique identifier associated with each cursor occurrence to the executing cursor-opening user-defined routine.

According to another aspect of the present invention there is provided a computer program product for use in an SQL database management system, the system supporting nested invocation of a set of user-defined routines by an application and supporting the definition of cursors in applications, the computer program product including a computer usable medium having computer readable code means embodied in said medium for associating a unique identifier with each cursor occurrence in the execution of a cursor-opening user-defined routine invoked directly or indirectly by an executing application, including computer readable program code means for defining a first value in the unique identifier corresponding to the nesting level of the cursor-opening user-defined routine, computer readable program code means for defining a second value in the unique identifier corresponding to the sequence in which the cursor-opening user-defined routine is invoked by the executing application, relative to the invocation of other user-defined routines at the nesting level of the cursor-opening user-defined routine, and computer readable program code means for passing the unique identifier associated with each cursor occurrence to the executing cursor-opening user-defined routine.

According to another aspect of the present invention there is provided the above computer program product in which the computer readable code means embodied in said medium for associating a unique identifier with each cursor occurrence further includes unique identifier associated with each cursor occurrence further includes computer readable program code means for defining a third value corresponding to the sequence in which the cursor occurrence is found relative to other cursor occurrences in the execution of the cursor-opening user-defined routine.

According to another aspect of the present invention there is provided the above computer program product in which the computer readable code means embodied in said medium for associating a unique identifier with each cursor occurrence in the execution of a cursor-opening user-defined routine invoked directly or indirectly by an executing application further includes computer readable program code means for defining and maintaining a set of nesting control block data structures, each nesting control block being associated with a unique nesting level of invoked user-defined routines, and including a nesting level identifier having a value corresponding to the associated nesting level and further including an invocation counter having a value corresponding to the sequence in which user-defined routines are executed at the associated nesting level.

According to another aspect of the present invention there is provided the above computer program product in which the computer readable code means embodied in said medium for associating a unique identifier with each cursor occurrence in the execution of a cursor-opening user-defined routine invoked directly or indirectly by an executing application further includes computer readable program code means for defining and maintaining a set of invocation control block data structures, each invocation control block being associated with a unique invoked user-defined routine, each invocation control block including an invocation control block nesting identifier having a value derived from the nesting level identifier in the nesting control block associated with the nesting level of the unique invoked user-defined routine, an invocation identifier having a value derived from the invocation counter in the nesting control block associated with the nesting level of the unique invoked user-defined routine, and a cursor counter having a value corresponding to the sequence in which cursors are opened in the execution of the unique invoked user-defined routine.

According to another aspect of the present invention there is provided a computer program product for use in an SQL database management system, the system supporting nested invocation of a set of user-defined routines by an application and supporting the definition of cursors, the computer program product including a computer usable medium having computer readable code means embodied in said medium for associating a unique identifier with each cursor occurrence in the execution of a cursor-opening user-defined routine invoked directly or indirectly by an executing application, including computer readable program code means for defining and maintaining a set of nesting control block data structures, each nesting control block being associated with a unique nesting level of invoked user-defined routines, and including a nesting level identifier having a value corresponding to the associated nesting level and containing an invocation counter having a value corresponding to the sequence in which user-defined routines are executed at the associated nesting level, computer readable program code means for defining and maintaining a set of invocation control block data structures, each invocation control block being associated with a unique invoked user-defined routine, each invocation control block including an invocation control block nesting identifier having a value derived from the nesting level identifier in the nesting control block for the nesting level of the unique invoked user-defined routine, an invocation identifier having a value derived from the invocation counter in the nesting control block for the nesting level of the unique invoked user-defined routine, and a cursor counter having a value corresponding to the sequence in which cursors are opened in the unique invoked user-defined routine, computer readable program code means for associating a unique identifier with each cursor occurrence in the execution of a cursor-opening user-defined routine invoked directly or indirectly by an executing application, the unique identifier including a first value derived from the invocation control block nesting identifier for the invocation control block associated with the cursor-opening user-defined routine, a second value derived from the invocation identifier for the invocation control block associated with the cursor-opening user-defined routine, and a third value derived from the cursor counter for the invocation control block associated with the cursor-opening user-defined routine, and computer readable program code means for passing the unique identifier associated with each cursor occurrence to the executing cursor-opening user-defined routine.

According to another aspect of the present invention there is provided a method for defining a set of cursor query identifiers in a SQL database management system, the system supporting nested invocation of a set of user-defined routines by an application, and supporting the definition of cursors in applications, the method including the steps of generating a nesting control block data structure for each unique nesting level of invoked user-defined routines, the nesting control block including a nesting level identifier having a value corresponding to the associated nesting level and further including an invocation counter having a value corresponding to the sequence in which user-defined routines are executed at the associated nesting level, generating an invocation control block data structure for each invoked user-defined routine, each invocation control block including an invocation control block nesting identifier having a value derived from the nesting level identifier in the nesting control block for the nesting level of the unique invoked user-defined routine, an invocation identifier having a value derived from the invocation counter in the nesting control block for the nesting level of the unique invoked user-defined routine, and a cursor counter having a value corresponding to the sequence in which cursors are opened in the unique invoked user-defined routine, and defining a unique cursor query identifier in the set of cursor query identifiers for each cursor occurrence in the execution of a cursor-opening user-defined routine invoked directly or indirectly by an executing application, the definition of the unique cursor query identifier further including the steps of deriving a first value component for the cursor query identifier from the invocation control block nesting identifier for the invocation control block associated with the cursor-opening user-defined routine, deriving a second value component for the cursor query identifier from the invocation identifier for the invocation control block associated with the cursor-opening user-defined routine, and deriving a third value component for the cursor query identifier from the cursor counter for the invocation control block associated with the cursor-opening user-defined routine.

BRIEF DESCRIPTION OF THE DRAWINGS

In the accompanying drawing which illustrates the invention by way of example only.

Figure 1:
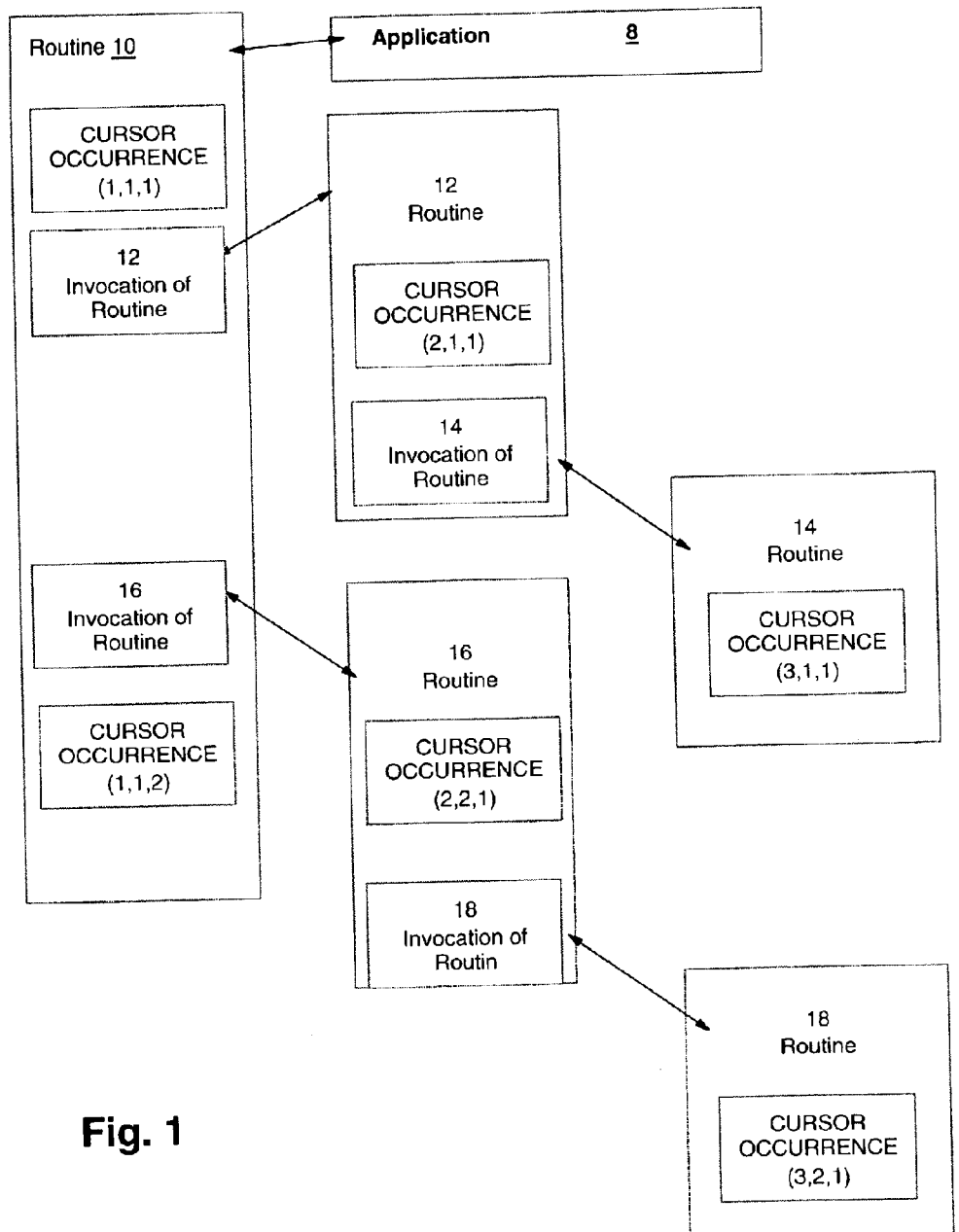
FIG. 1 is a block diagram showing an example execution path for routines opening cursors used to illustrate the cursor identification of the preferred embodiment.

In the drawing, the preferred embodiment of the invention is illustrated by way of example. It is to be expressly understood that the description and drawings are only for the purpose of illustration and as an aid to understanding, and are not intended as a definition of the limits of the invention.

DETAILED DESCRIPTION OF THE INVENTION

The RDBMS of the preferred embodiment supports both cursor definition and use and the invocation of user-defined routines by application programs. Such user-defined routines include user-defined functions (UDFs), stored procedures (STPs) and other programming entities that contain SQL statements which are able to be invoked by an application program directly or indirectly within an SQL statement.

The preferred embodiment provides applications with the ability to define and use cursors as is typically permitted in SQL database systems. However, as is described in more detail below, the preferred embodiment system permits cursors to occur in contexts that prior art systems do not typically support. The approach of the preferred embodiment is to associate a cursor query identifier with each cursor opened by an application (including those opened indirectly by the application invoking nested user-defined routines). The database system (or server) responds to a request from an application (database client) to open a cursor with, amongst other information, a cursor query identifier that is used to avoid potential referencing difficulties. The application will use the cursor query identifier to uniquely refer to the cursor and to avoid otherwise ambiguous references to the cursor.

The preferred embodiment is described with respect to a simple example of a set of user-defined routines in which multiple cursors relating to the same cursor definition are opened; different cursor occurrences are generated by an application through invoked nested user-defined routines, all relating to the same cursor definition. The preferred embodiment, as described below, associates different cursor query identifiers with each of the different cursor occurrences and those cursor query identifiers are passed back to the user-defined routines invoked by the application.

FIG. 1 shows, in block diagram format, the path of routine execution and cursor generation for an example application. Routine blocks in FIG. 1 represent the execution of routines that occur during execution. As will be appreciated, routines shown as separate blocks in FIG. 1 may be the same routine invoked recursively, or may be different routines.

In FIG. 1, application 8 is shown invoking routine 10. Routine 10 includes an OPEN statement that relates to a defined cursor to generate a first cursor occurrence, as shown in FIG. 1. This is followed in the block representing execution of routine 10 by the invocation of routine 12. Routine 12 is shown having both an invocation of routine 14 and a preceding occurrence of a cursor (relating to the same cursor definition as did the cursor opened in routine 10). Nested routine 14 is shown with a further cursor occurrence. Routine 10 has a further invocation point for routine 16. Routine 16 has a cursor occurrence followed by the invocation of routine 18. Routine 18 includes a further occurrence of the same cursor. The last cursor occurrence in FIG. 1 follows the invocation point of routine 16 in routine 10.

As will be appreciated, in the prior art, the cursor OPEN statements reflected in the block diagram of FIG. 1 would not be permitted as cursor occurrences following the first cursor opened in routine 10 would be considered errors. Such systems could not distinguish between the different opened cursors relating to the same cursor definition and having the same cursor name and therefore the later cursor occurrences would not be supported. According to the preferred embodiment, however, each cursor opened by the RDBMS has associated with it a cursor query identifier that is used to reference a particular cursor occurrence.

The cursor query identifier of the preferred embodiment includes three values:

1. a cursor nesting level identifier;
2. an invocation identifier; and
3. a cursor identifier.

The definition of the cursor query identifier as a combination of these three values permits the unique identification of cursor occurrences in the recursive and repetitive invocation of routines and where cursors with the same name are opened in the same routine. The system of the preferred embodiment therefore does not flag the later cursor occurrences in the example of FIG. 1 as being errors. The later cursors are distinguished from the first cursor occurrence, and from each other, by the use of the unique cursor query identifier.

FIG. 1 shows a three-value tuple being associated with each cursor occurrence. This tuple corresponds to the three-part cursor query identifier and is defined as (<nesting level>, <invocation identifier>, <cursor counter>). As will be apparent from this description, a two-part tuple may alternatively be used for the cursor query identifier. This may be desirable where multiple cursor occurrences relating to a single cursor definition in the same routine are not supported. In such a system the nesting level and invocation identifier will distinguish cursors with the same name that are opened in different routine invocations and at different nesting levels. In systems (such as the preferred embodiment) where the cursor name is used in addition to the cursor query identifier, the third value need only incremented when duplicate occurrences of the cursor with the same name under the same invocation. In other cases, the third value is incremented for each new cursor occurrence under an invocation.

The cursor nesting level corresponds to the nesting level of the routine where the cursor is opened. In the example of FIG. 1, the first nesting level is the level occupied by the execution block for routine 10 (level 1). There is a new nesting level entered on the invocation of routine 12. Both routines 12 and 16 are at that nesting level (level 2). A further nesting level is entered when routine 14 is invoked. Both routines 14 and 18 share that nesting level (level 3).

The second part of the unique identifier is the invocation identifier. The invocation identifier has a value dependent on the routine in which the cursor was opened.

The third value in the cursor query identifier is a unique counter that is defined to permit each cursor occurrence to be differentiated from other occurrences within the same invocation of a routine.

The cursor query identifier provided for a cursor in the preferred embodiment is dependent on, amongst other factors, the execution context for the routine in which the cursor is opened. The system of the preferred embodiment creates and maintains two types of control blocks to define cursor query identifiers. The control blocks are defined portions of memory in which data is maintained reflecting the state of execution of the routines in the database system. A nesting level control block is created whenever a new nesting level (as described below) is entered. A new invocation control block is associated with a routine invocation each time that the routine is invoked (for example by a CALL statement). As will be set out below in more detail, the invocation control block is used directly to define the three values in the cursor query identifier.

The nesting control block is created when a nesting level is first entered and is removed when the nesting level is no longer needed since all invocations at that level have ended. An invocation control block for a particular routine is maintained in the RDBMS until the latter of the following two events:

1. application execution returns from the routine, or
2. there are no remaining open cursors directly or indirectly associated with the invocation control block, In other words, the invocation control block is persistent until the cursors associated with the related invoked routine, and any cursors opened by the routine at a lower nesting level, are closed. In the preferred embodiment, the invocation control block is categorized as either active or inactive. An invocation control block for an invoked routine becomes inactive upon returning from the invoked routine.

A further data construct used to define the cursor query identifier is an application nesting level value that is used to record the current nesting level of a routine being executed. The application nesting level value is initialized at 0 for each application. For each routine invocation the application nesting level counter is incremented by one. The application nesting level is decremented when an application returns from an invoked routine. In this way the application nesting level value reflects the current nesting level of the application's active processing.

Each invocation control block includes a context nesting level value derived from the application nesting level. The context nesting level is defined to be the value of the application nesting level at the time that the invocation control block is created (in other words, the value of the application nesting level when a routine is invoked).

Each cursor query identifier is defined to have a cursor nesting level equal to the context nesting level in the invocation control block for the invoked routine. As may be seen from the above description, the cursor query identifier takes its nesting level value indirectly from the application nesting level value, as reflected in the context nesting level for the appropriate invocation control block.

The second value in the cursor query identifier relates to an invocation identifier. This is a unique identifier for each invocation that occurs at a given nesting level. This value is again derived from the nesting and invocation control blocks.

The nesting control block maintains a counter for invocation identifiers. When the new invocation control block is created, a unique invocation identifier is assigned to it by incrementing the counter within the appropriate nesting control block. The initial application environment is considered to have an invocation control block with an invocation identifier of 0. The invocation identifier from the invocation control block is used as the invocation identifier for each cursor query identifier defined in that routine invocation.

The third element of the cursor query identifier of the preferred embodiment is derived from a cursor counter maintained in the invocation control block. Each successful open request associated with a cursor in a routine will result in an incremented value for the cursor counter. This permits an application to open occurrences of the same cursor definition more than once within the same routine. This may be desirable where an application is a backend for a web service, for example, and the application permits different users to access a database using the same application code. In such a case, the application will include logic to differentiate between multiple cursor occurrences within the same routine. The cursor counter permits the application to make such a differentiation.

In accordance with the preferred embodiment, the six cursor occurrences shown in FIG. 1 each relate to the same cursor name. According to the preferred embodiment, each cursor occurrence will be provided with a unique cursor query identifier.

FIG. 1 shows routines 10, 12, 14, 16, 18. As described above, the application nesting value is initialized at 0 for each application. FIG. 1 shows that routine 10 is invoked directly by application 8. The nesting control block for nesting level 1 is created when routine 10 is invoked and its invocation identifier counter will be initialized to 0 as well. When routine 10 is invoked, a unique invocation control block is created to represent this invocation, the nesting level control block invocation identifier counter is incremented and the result, 1, is assigned as the invocation identifier for the new invocation control block. Next the unique cursor counter within this control block is initialized to 0 as it is for each new invocation control block. When the first cursor occurrence in routine 10 is opened, it is assigned a cursor nesting level of 1 obtained from the current nesting level, a cursor invocation identifier of 1 obtained from the invocation identifier in the current invocation control block, and a unique cursor identifier of 1 obtained by incrementing the unique cursor counter in the current invocation control block.

As a result of, for example, a CALL statement to a STP, a new nested routine 12 will be invoked by routine 10. Due to this routine being executed, the application nesting level is set to 2. A new nesting level control block is created for nesting level 2 and then a new invocation control block for this call to routine 12 is created with the invocation identifier of 1 which is obtained after incrementing the invocation identifier counter in the nesting level 2 control block. The cursor occurrence in routine 12 will therefore have a cursor nesting level of 2, an invocation identifier of 1, and a unique cursor identifier of 1 obtained by incrementing the unique cursor counter in the current invocation control block.

The invocation of routine 14 and its cursor occurrence are treated in a similar fashion. As a result, the cursor occurrence in routine 14 will have a cursor nesting level of 3, an invocation identifier of 1, and a unique cursor identifier of 1.

As indicated above, as execution returns from an invoked routine, the application nesting level is decremented. For this reason, the application nesting level at the time of the generation of the invocation control block for routine 16 is 2. However, the invocation identifier counter in the nesting level 1 control block was previously incremented by the invocation of routine 12 and thus, when it is incremented again by the invocation of routine 16, the resultant invocation identifier for the new invocation control block is 2. The cursor occurrence in routine 16 therefore has a cursor nesting level of 2, an invocation identifier of 2, and a unique cursor identifier of 1 obtained by incrementing the unique cursor counter in the invocation control block for routine 16.

Similarly, the cursor occurrence in routine 18 has a cursor nesting level of 3, an invocation identifier of 2, and a unique cursor identifier of 1 obtained by incrementing the unique cursor counter in the invocation control block for routine 18.

In routine 10, a second cursor occurrence is shown. As indicated above, the unique cursor counter in an invocation control block is incremented for each new cursor occurrence in the same routine invocation. For this reason, the second cursor occurrence in routine 10 has a cursor nesting level of 1, an invocation identifier of 1, and a unique cursor identifier of 2. This permits the second occurrence of the same cursor in routine 10 to be differentiated from the first occurrence in the same routine.

As can be seen from the above simple example, each cursor occurrence in repeated or recursive invocations of routines will result in a unique three-part identifier being generated that can be used at the client layer and at the server layer to correctly identify the cursor. The preferred embodiment may also be modified to remove the cursor counter element of the identifier where the database is not required to support multiple cursor occurrences within the same routine. In such a case, a two-part identifier will be sufficient to permit nested and recursive routine invocation.

Although a preferred embodiment of the invention has been described above, it will be appreciated by those skilled in the art that variations may be made, without departing from the spirit of the invention or the scope of the appended claims.

The embodiments of the invention in which an exclusive right or privilege is claimed are described as follows:

1. A database management system supporting nested invocation of user-defined routines and the definition of cursors, and the system carrying out execution steps in response to requests received from applications and from user-defined routines, the system comprising means for associating a unique identifier with each cursor occurrence request received by the system, the unique identifier including a first value corresponding to the nesting level of the source process from which the request originated, and a second value uniquely identifying the source process, relative to other sources at the same nesting level; and means for passing the unique identifier to the requesting process in response to the cursor occurrence request, wherein the request is received from a requesting process executing an application or a cursor-opening user-defined routine, and wherein the unique identifier associated with each cursor occurrence further comprises a third value uniquely identifying the cursor occurrence relative to other cursor occurrences with the same cursor name taking place in the execution of the cursor-opening user-defined routine or application.

2. The system of claim 1 wherein the system is an SQL system.

3. A database management system, the system supporting nested invocation of a set of user-defined routines by an application, and supporting the definition of cursors in applications, the system comprising:

means for associating a unique identifier with each cursor occurrence in the execution of a routine invoked directly or indirectly by an executing application, the unique identifier comprising a first value corresponding to the nesting level of the executing application; and a second value corresponding to the sequence of the executing application relative to other applications at the same nesting level; and means for passing the unique identifier associated with each cursor occurrence to the executing application, wherein the executing application directly or indirectly invokes a cursor-opening user-defined routine, and in which the unique identifier associated with each cursor occurrence further comprises a third value corresponding to the sequence in which the cursor occurrence is found relative to other cursor occurrences in the execution of the cursor-opening user-defined routine.

4. The system of claim 3 wherein the system is an SQL system.

5. The system of claim 3 in which the means for associating a unique identifier further comprises:

means for defining and maintaining a set of nesting control block data structures, each nesting control block being associated with a unique nesting level of invoked user-defined routines, and comprising a nesting level identifier having a value corresponding to the associated nesting level and further comprising an invocation counter having a value corresponding to the sequence in which user-defined routines are executed at the associated nesting level.

6. The system of claim 5 in which the means for associating a unique identifier further comprises means for defining and maintaining a set of invocation control block data structures, each invocation control block being associated with a unique invoked user-defined routine, each invocation control block comprising an invocation control block nesting identifier having a value derived from the nesting level identifier in the nesting control block associated with the nesting level of the unique invoked user-defined routine, an invocation identifier having a value derived from the invocation counter in the nesting control block associated with the nesting level of the unique invoked user-defined routine, and a cursor counter having a value corresponding to the sequence in which cursors are opened.

7. A database management system, the system supporting nested invocation of a set of user-defined routines by an application, and supporting the definition of cursors in applications, the system comprising:

means for defining and maintaining a set of nesting control block data structures, each nesting control block being associated with a unique nesting level of invoked user-defined routines, and comprising a nesting level identifier having a value corresponding to the associated nesting level and containing an invocation counter having a value corresponding to the sequence in which user-defined routines are executed at the associated nesting level, means for defining and maintaining a set of invocation control block data structures, each invocation control block being associated with a unique invoked user-defined routine, each invocation control block comprising an invocation control block nesting identifier having a value derived from the nesting level identifier in the nesting control block for the nesting level of the unique invoked user-defined routine, an invocation identifier having a value derived from the invocation counter in the nesting control block for the nesting level of the unique invoked user-defined routine, and a cursor counter having a value corresponding to the sequence in which cursors are opened in the unique invoked user-defined routine, means for associating a unique identifier with each cursor occurrence in the execution of a routine invoked by an executing application, the unique identifier comprising a first value derived from the invocation control block nesting identifier for the invocation control block associated with the executing application, a second value derived from the invocation identifier for the invocation control block associated with the executing application, and a third value derived from the cursor counter for the invocation control block associated with the executing application, and means for passing the unique identifier associated with each cursor occurrence to the executing application.

8. The system of claim 7 wherein the executing application invokes, directly or indirectly, a cursor-opening user-defined routine.

9. The system of claim 7 wherein the database management system is an SQL system.

10. A computer program product for use in a database management system, the system supporting nested invocation of a set of user-defined routines by an application and supporting the definition of cursors, the computer program product comprising a computer usable medium having computer readable code means embodied in said medium for associating a unique identifier with each cursor occurrence in the execution of an executing application, comprising computer readable program code means for defining a first value in the unique identifier corresponding to the nesting level of the executing application, computer readable program code means for defining a second value in the unique identifier corresponding to the sequence in which the executing application is invoked by the executing application, relative to other executing applications at the same nesting level, and computer readable program code means for passing the unique identifier associated with each cursor occurrence to the executing application, wherein the executing application invokes, directly or indirectly, a cursor-opening user-defined routine, and in which the computer readable code means embodied in said medium for associating a unique identifier with each cursor occurrence further comprises unique identifier associated with each cursor occurrence further comprises computer readable program code means for defining a third value corresponding to the sequence in which the cursor occurrence is found relative to other cursor occurrences in the execution of the cursor-opening user-defined routine.

11. The computer program product of claim 10 in which the computer readable code means embodied in said medium for associating a unique identifier with each cursor occurrence in the execution of a cursor-opening user-defined routine invoked directly or indirectly by an executing application further comprises:

computer readable program code means for defining and maintaining a set of nesting control block data structures, each nesting control block being associated with a unique nesting level of invoked user-defined routines, and comprising a nesting level identifier having a value corresponding to the associated nesting level and further comprising an invocation counter having a value corresponding to the sequence in which user-defined routines are executed at the associated nesting level.

12. The computer program product of claim 11 in which the computer readable code means embodied in said medium for associating a unique identifier with each cursor occurrence in the execution of a cursor-opening user-defined routine invoked directly or indirectly by an executing application further comprises computer readable program code means for defining and maintaining a set of invocation control block data structures, each invocation control block being associated with a unique invoked user-defined routine, each invocation control block comprising an invocation control block nesting identifier having a value derived from the nesting level identifier in the nesting control block associated with the nesting level of the unique invoked user-defined routine, an invocation identifier having a value derived from the invocation counter in the nesting control block associated with the nesting level of the unique invoked user-defined routine, and a cursor counter having a value corresponding to the sequence in which cursors are opened in the execution of the unique invoked user-defined routine.

13. The computer program product of claim 10 wherein the database management system is an SQL system.

14. A computer program product for use in a database management system, the system supporting nested invocation of a set of user-defined routines by an application and supporting the definition of cursors in applications, the computer program product comprising a computer usable medium having computer readable code means embodied in said medium for associating a unique identifier with each cursor occurrence in the execution of an executing application, comprising computer readable program code means for defining and maintaining a set of nesting control block data structures, each nesting control block being associated with a unique nesting level of invoked user-defined routines, and comprising a nesting level identifier having a value corresponding to the associated nesting level and containing an invocation counter having a value corresponding to the sequence in which user-defined routines are executed at the associated nesting level, computer readable program code means for defining and maintaining a set of invocation control block data structures, each invocation control block being associated with a unique invoked user-defined routine, each invocation control block comprising an invocation control block nesting identifier having a value derived from the nesting level identifier in the nesting control block for the nesting level of the unique invoked user-defined routine, an invocation identifier having a value derived from the invocation counter in the nesting control block for the nesting level of the unique invoked user-defined routine, and a cursor counter having a value corresponding to the sequence in which cursors are opened in the unique invoked user-defined routine, computer readable program code means for associating a unique identifier with each cursor occurrence in the execution of an executing application, the unique identifier comprising a first value derived from the invocation control block nesting identifier for the invocation control block associated with the executing application, a second value derived from the invocation identifier for the invocation control block associated with the executing application, and a third value derived from the cursor counter for the invocation control block associated with the executing application, and computer readable program code means for passing the unique identifier associated with each cursor occurrence to the executing application.

15. The computer program product of claim 14 wherein the executing application invokes, directly or indirectly, a cursor-opening user-defined routine.

16. The computer program product of claim 14 wherein the database management system is an SQL system.

17. A method for defining a set of cursor query identifiers in a database management system, the system supporting nested invocation of a set of user-defined routines by an application, and supporting the definition of cursors in applications, the method comprising:

generating a nesting control block data structure for each unique nesting level of invoked user-defined routines, the nesting control block comprising a nesting level identifier having a value corresponding to the associated nesting level and further comprising an invocation counter having a value corresponding to the sequence in which user-defined routines are executed at the associated nesting level, generating an invocation control block data structure for each invoked user-defined routine, each invocation control block comprising an invocation control block nesting identifier having a value derived from the nesting level identifier in the nesting control block for the nesting level of the unique invoked user-defined routine, an invocation identifier having a value derived from the invocation counter in the nesting control block for the nesting level of the unique invoked user-defined routine, and a cursor counter having a value corresponding to the sequence in which cursors are opened in the unique invoked user-defined routine, and defining a unique cursor query identifier in the set of cursor query identifiers for each cursor occurrence in the execution of an executing application, the definition of the unique cursor query identifier further comprising the steps of deriving a first value component for the cursor query identifier from the invocation control block nesting identifier for the invocation control block associated with the executing application, deriving a second value component for the cursor query identifier from the invocation identifier for the invocation control block associated with the executing application, and deriving a third value component for the cursor query identifier from the cursor counter for the invocation control block associated with the executing application.

18. The method of claim 17 wherein the executing application invokes, directly or indirectly, a cursor-opening user-defined routine.

19. The method of claim 17 wherein the database management system is an SQL system.

* * * * *